Jan. 5, 1926.  1,568,315
H. B. BROWN
THERMOMETER MOUNTING
Filed Sept. 18, 1922

INVENTOR.
Henry B. Brown
BY Frederick F. Church
his ATTORNEY

Patented Jan. 5, 1926.

1,568,315

UNITED STATES PATENT OFFICE.

HENRY B. BROWN, OF ROCHESTER, NEW YORK, ASSIGNOR TO TAYLOR INSTRUMENT COMPANIES, OF ROCHESTER, NEW YORK, A CORPORATION OF NEW YORK.

THERMOMETER MOUNTING.

Application filed September 18, 1922. Serial No. 588,824.

*To all whom it may concern:*

Be it known that I, HENRY B. BROWN, a citizen of the United States, residing at Rochester, in the county of Monroe and State of New York, have invented certain new and useful Improvements in Thermometer Mountings; and I do hereby declare the following to be a full, clear, and exact description of the same, reference being had to the accompanying drawing, forming a part of this specification, and to the reference numerals marked thereon.

This invention relates to measuring instruments such, for example, as thermometers, and more particularly to the combination of such instruments with suitable means for mounting and supporting the same, one object of the invention being to provide a practical device of this character having the advantages also of economy in manufacture and convenience in use. From a more particular aspect, it is a further object of the invention to provide such an instrument having a mounting or support comprising an enameled scale plate advantageously combined with the associated parts so as to facilitate the manufacture of the instrument in improved quality and at a relatively low cost. To these and other ends the invention consists in certain improvements and combinations of parts, all as will be hereinafter more fully described, the novel features being pointed out in the claims at the end of the specification.

In the drawings.

Similar reference numerals throughout the several views indicate the same parts.

Figure 1:
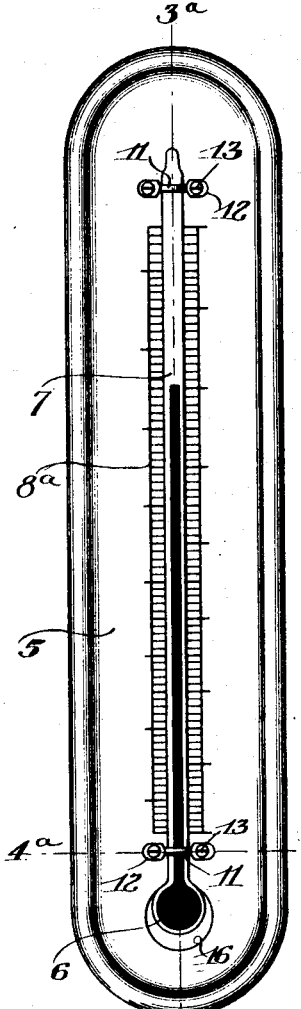
Figure 1 is a front elevation of an instrument embodying the present invention.

The embodiment of the invention at present preferred and herein disclosed by way of illustration of the principles involved comprises a combined thermometer and mounting, although it is to be understood that the invention may be applied to various other types of instruments. The present construction comprises preferably a main or scale plate 5 for the thermometer of sheet metal having the elongated shape with rounded ends and rolled and rearwardly turned margins as shown in the drawings to afford a rigid construction and at the same time present an ornamental and pleasing appearance. The thermometer is shown as comprising a bulb portion 6 and a light pervious stem or tube 7, the plate 5 projecting on all sides well beyond the thermometer to protect the same.

Figure 4:
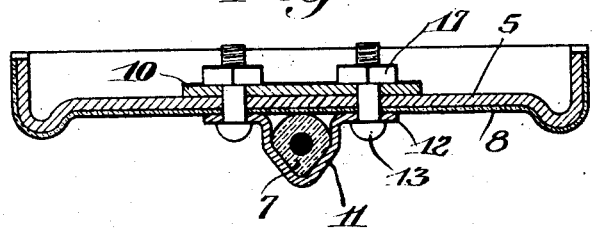
Figure 4 is an enlarged sectional view on the line 4ª—4ª of Figure 1.

It is desirable in a construction of this nature to finish and color the forward side or face of the metal plate 5 by a suitable film or coating such as the vitreous enamel shown at 8, Figure 4, beneath or in which is indelibly marked the usual scale 8ª adjacent and cooperating with the thermometer tube. Means are required for securing the tube on plate 5 and also for the attachment of bracket or other supporting means to plate 5 preferably at its rear side, but it has been found that if the material of the plate is materially thickened at any point as, for example, by the integral formation therewith of clips or bracket means or the welding of the same thereto for the purposes indicated, the unequal heating and cooling of the plate caused by such variations in its thickness of material interferes with the uniform application of the enamel or glazing, so that the latter becomes streaked or craked, thereby marring the appearance of the instrument and causing a large waste of material.

It has been found that the above difficulty may be overcome in a practical and advantageous manner by completing plate 5 separately and subsequently combining therewith a back or supporting plate 10 and securing the thermometer and the back plate to the main plate 5 by devices passed through openings formed in the main plate. To this end a plurality of clips or straps 11 are provided and formed to embrace the thermometer tube as shown in Figure 4 for holding the same on the main plate. Two such straps are preferably employed, one located adjacent each end of the tube to clear the scale and the ends of these straps are turned outwardly parallel with the face of the main plate as at 12, Figure 4. The main plate has openings formed therein at these portions and the straps are perforated at their ends and located with the perforations in registry with the openings in the plate to receive suitable means such as small bolts 13 for securing the parts together and holding the tube immovable on the face of the plate. The latter may be provided with an opening 14, Figure 3, to receive a rearwardly projecting finger 15 formed at the upper end of the tube for initially locating the same on the plate, as well understood in the art. The main plate is also preferably formed with an aperture 16 opposite the thermometer bulb for receiving the latter and affording access of the atmosphere to all sides thereof.

The back or supporting plate 10 is also preferably secured to the main plate by means of securing devices passed through registering openings in the two plates, and for this purpose use is advantageously made of the same bolts 13 holding the tube clips. The black plate is therefore provided with openings registering with bolts 13 which are of sufficient length to extend beyond the back plate and receive securing nuts 17 which effectively bind all of the parts together. The construction thus provides for the stamping out and enameling of the main plate 5 independently of the other parts for the reasons described above, and the subsequent assembling of the other parts therewith in a convenient and economical manner.

Figure 2:
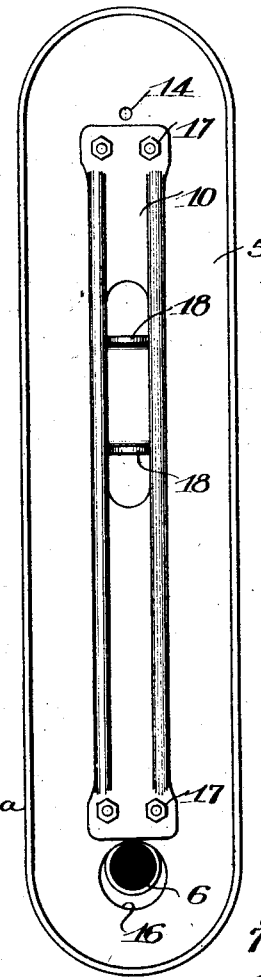
Figure 2 is a rear elevation of the same with parts removed.
Figure 3:
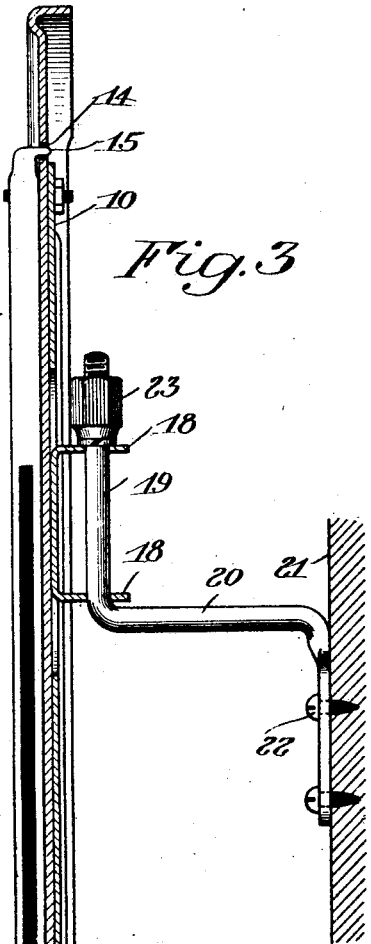
Figure 3 is an enlarged sectional view on the line 3ª—3ª of Figure 1.

As indicated above the back plate 5 is provided with bracket means for supporting the instrument on a wall or other suitable object preferably having for this purpose a pair of spaced ears 18, Figures 2 and 3, struck up perpendicularly therefrom and formed with perforations through which are passed one end of a bracket 19. The present embodiment being particularly adapted for use as a window thermometer, bracket 19 is turned horizontally as at 20 to space the instrument from a wall or other surface 21 to which the other angularly disposed end of the bracket is attached as by means of screws 22. The portion 20 of the bracket sustains the lower supporting ear 18 of the back plate and the bracket is extended at its end beyond the other ear and threaded for the reception of a nut 23 holding the instrument on the bracket. A further advantage of the provision of a separately formed back plate resides in the fact that the parts, such as ears 18, for connecting the instrument with the bracket supporting means are not subjected to the application of the enamel which would otherwise tend to partially fill and reduce the size of the openings in ears 18 for reception of the bracket 19. Such enamel is too hard to permit of removal without considerable difficulty and if the openings be made larger than required to compensate for such filling up with enamel a poor and uncertain fit on the bracket results. The present form of construction overcomes this difficulty in a satisfactory manner, and affords a readily detachable, pivotal form of support for the instrument so that it may be adjusted to the particular angle at which it can be viewed to best advantage.

It is apparent from the above description and the drawings that the parts are all simple in form and capable of being manufactured at a relatively low cost. The main or scale plate 5 is separately made with a uniform thickness adapting it to receive the enamel finish with a high degree of perfection and the various parts may then be economically and effectively assembled and combined in the manner described. The bracket means is also simple and practical in form, and the various parts of the instrument are readily detachable for repair or other purposes. The instrument is conveniently adjustable to the angle at which it may be most clearly viewed and its generally simple and harmonious features afford a pleasing appearance.

I claim as my invention:

1. A thermometer comprising a tube, a mounting plate provided with openings therein and with a scale and having a rearwardly turned, peripheral flange, a back plate disposed within said flange having openings therein registering with those in said mounting plate, means on said back plate for supporting the instrument, and securing devices passed through said registering openings and embracing said tube for securing the latter on said mounting plate and said plates together.

2. A thermometer comprising a tube, an enameled metal mounting plate provided with openings therein and marked with a scale for said tube, a metal back plate smaller than said mounting plate provided with means for supporting the instrument and with openings registering with those in said mounting plate, and securing devices passed through said registering openings and embracing said tube.

3. A thermometer comprising a tube, a mounting plate provided with openings therein and with a scale, a relatively small back plate having openings therein registering with those in said mounting plate and having bracket lugs struck up therefrom, a single bracket co-operating with said lugs, and securing devices passed through said registering openings and embracing said tube.

4. An instrument comprising a light pervious tube, a main plate adapted to receive said tube within its outlines to form a protective mounting therefor and having its forward side enameled and marked with a scale cooperating with said tube, a back plate, a bracket pivotally connected with said back plate for adjustably supporting the instrument, and securing devices passed through aligned openings formed in said plates for holding said tube on said main plate and for detachably securing said plates together in juxtaposed relation.

5. An instrument comprising a thermometer tube, a main plate adapted to receive said tube within its outlines to form a protective mounting therefor and having its forward side enameled and marked with a scale cooperating with said tube, a back plate having spaced perforated ears struck up therefrom, a bracket passed through the perforations in said ears for pivotally supporting the instrument, and securing devices passed through aligned openings formed in said plates for holding said tube on said main plate and for detachably securing said plates together.

HENRY B. BROWN.